US009086986B2

(12) United States Patent
Cain, III et al.

(10) Patent No.: US 9,086,986 B2
(45) Date of Patent: Jul. 21, 2015

(54) DETECTION OF CONFLICTS BETWEEN TRANSACTIONS AND PAGE SHOOTDOWNS

(75) Inventors: Harold W. Cain, III, Katonah, NY (US); Hung Q. Le, Austin, TX (US); Bryan Lloyd, Austin, TX (US); Shih-Hsiung Tung, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 228 days.

(21) Appl. No.: 13/606,743

(22) Filed: Sep. 7, 2012

(65) Prior Publication Data
US 2014/0075151 A1    Mar. 13, 2014

(51) Int. Cl.
*G06F 12/10*    (2006.01)

(52) U.S. Cl.
CPC ...... *G06F 12/1027* (2013.01); *G06F 2212/682* (2013.01); *G06F 2212/683* (2013.01)

(58) Field of Classification Search
None
See application file for complete search history.

(56) References Cited

U.S. PATENT DOCUMENTS

| 5,263,140 | A * | 11/1993 | Riordan | 711/207 |
| 5,526,054 | A * | 6/1996 | Greenfield et al. | 348/467 |
| 6,601,143 | B1 | 7/2003 | Lamparter | |
| 6,684,305 | B1 * | 1/2004 | Deneau | 711/159 |
| 6,772,291 | B2 | 8/2004 | Palanca et al. | |
| 6,807,607 | B1 | 10/2004 | Lamparter | |
| 6,877,067 | B2 | 4/2005 | Yamazaki | |
| 6,970,981 | B2 | 11/2005 | Kanaley | |
| 7,284,112 | B2 * | 10/2007 | Bradford et al. | 711/206 |
| 7,822,926 | B2 * | 10/2010 | Croxford et al. | 711/129 |
| 7,844,779 | B2 | 11/2010 | Kornegay et al. | |
| 7,975,107 | B2 | 7/2011 | Beckmann et al. | |
| 2005/0125623 | A1 * | 6/2005 | Dale et al. | 711/200 |
| 2007/0005932 | A1 * | 1/2007 | Covelli et al. | 711/207 |
| 2007/0143287 | A1 * | 6/2007 | Adl-tabatabai et al. | 707/8 |
| 2010/0275209 | A1 | 10/2010 | Detlefs | |
| 2010/0332721 | A1 | 12/2010 | Yamada et al. | |
| 2011/0022805 | A1 | 1/2011 | Schreter | |
| 2011/0145552 | A1 | 6/2011 | Yamada et al. | |
| 2011/0161585 | A1 | 6/2011 | Kottapalli et al. | |
| 2014/0040567 | A1 * | 2/2014 | Pohlack et al. | 711/152 |

OTHER PUBLICATIONS

Yen, Luke. "Signatures in Transactional Memory Systems." p. i-iii, 1-16. Published 2009. <http://research.cs.wisc.edu/multifacet/theses/luke_yen_phd.pdf>.*

(Continued)

*Primary Examiner* — Charles Rones
*Assistant Examiner* — Hewy Li
(74) *Attorney, Agent, or Firm* — Scully, Scott, Murphy & Presser, P.C.; Preston J. Young, Esq.

(57) ABSTRACT

There is provided a method for detecting a conflict between a transaction and a TLB (Translation Lookaside Buffer) shootdown in a transactional memory in which a TLB shootdown operation message is received by a processor to invalidate at least one entry in a TLB of the processor corresponding to at least one page. The processor tracks pages touched by the transaction. The processor determines whether the received TLB shootdown operation message is associated with one of the touched pages. The processor aborts the transaction in response to determining that the received TLB shootdown operation message is associated with one of the touched pages.

12 Claims, 4 Drawing Sheets

(56) References Cited

OTHER PUBLICATIONS

Talluri, Madhusudhan. "Surpassing the TLB Performance of Superpages with Less Operating System Support." Published Oct. 1994.*

Brendan. "Re: Use of INVLPG." Posted Oct. 22, 2008. <http://forum.osdev.org/viewtopic.php?f=1&t=18222>.*

Sanchez, Daniel. "Implementing Signatures for Transactional Memory." Published 2007.*

Yen, Luke. "Notary: Hardware Techniques to Enhance Signatures". Published Nov. 2008.*

Titos-Gil, Ruben. "ZEBRA: A Data-Centric, Hybrid-Policy Hardware Transactional Memory Design". Published Jun. 2011.*

Tomic et al. "Hardware Transactional Memory with Operating System Support, HTMOS". Published in 2007. <https://www.bscmsrc.eu/sites/default/files/HTMOS_hppc2007.pdf>.*

Herlihy, M, et al., "Transactional Memory: Architectural Support for Lock-Free Data Structures", Proceedings of the 20th International Symposium in Computer Architecture, pp. 289-300, 1993.

Guerraoui et al, "Robust Contention Management in Software Transactional Memory," Proceedings of the OOPSLA 2005 Workshop on Synchronization and Concurrency in Object-Oriented Languages, 2005.

Bright, "IBM's new transactional memory: make-or-break time for multithreaded revolution," arstechnica.com Aug. 2011.

Blake et al., "Bloom Filter Guided transaction Scheduling," In HPCA, 2011.

Abadi et al., "Transactional Memory with Strong Atomicity Using Off-the-Shelf Memory Protection Hardware," PPoPP'09, Feb. 14-18, 2009, Raleigh, North Carolina.

"Bloom filter", Wikipedia, last modified on Jun. 19, 2012.

\* cited by examiner

| PAGE SIZE | INDEX BITS |
|---|---|
| 4KB | FROM 36TH BIT OF EFFECTIVE ADDRESS TO 51ST BIT OF EFFECTIVE ADDRESS |
| 64KB | FROM 36TH BIT OF EFFECTIVE ADDRESS TO 47TH BIT OF EFFECTIVE ADDRESS |
| 16MB | FROM 36TH BIT OF EFFECTIVE ADDRESS TO 39TH BIT OF EFFECTIVE ADDRESS |
| 16GB | FROM 24TH BIT OF EFFECTIVE ADDRESS TO 29TH BIT OF EFFECTIVE ADDRESS |

FIG. 2

DETECTION OF CONFLICTS BETWEEN TRANSACTIONS AND PAGE SHOOTDOWNS

BACKGROUND

This disclosure relates generally to a method for detecting a conflict between a transaction and a TLB (Translation Lookaside Buffer) shootdown in a system supporting transactional memory, and particularly to a method for preventing a transaction from being aborted if there is no conflict between that transaction and a TLB shootdown.

BACKGROUND OF THE INVENTION

Currently, there are at least two ways to translate an effective address, which is issued from or by a processor, to a physical address as follows. First, there exists a system with a two-level virtual memory translation system, for example, IBM® PowerPC®, which translates from an effective address to a virtual address, and then from the virtual address to a physical address. Second, there exists another system with a single-level virtual memory translation system, e.g., Intel® x86, which just translates from effective address to physical address.

In the first system described above, a TLB (Translation Lookaside Buffer) is a memory storage device that stores mappings between effective addresses, virtual addresses, and physical addresses in a computer device or computing system. In the second system described above, a TLB stores mappings between effective addresses and physical addresses. As known in the computing arts, an effective address is also called a logical address. A physical address is also called a real address.

A transactional memory refers to a data-coherence protocol. In the transactional memory, a transaction includes a finite number of instructions. Every transaction can run concurrently. At the end of a transaction, a thread or processor, which runs a transaction, attempts to make changes caused by that transaction permanent. These changes can become permanent only if another thread has not made an access that conflicts with that transaction, where an access is said to be conflicting if the two accesses access the same memory location and at least one of them is a write. Maurice Helihy et al., "Transactional Memory: Architectural Support for Lock-Free Data Structures," wholly incorporated by reference as if set forth herein, describes the operation of an exemplary transactional memory system in detail.

TLB shootdown refers to an action of a processor that causes other processors to invalidate at least one entry in their TLBs. An example of TLB shootdown operation command or instruction includes, but is not limited to: tlbie (Translation Lookaside Buffer Invalidate Entry) instruction. The tlbie instruction issued by a first processor to other processors is run to make a TLB entry invalid for a subsequent effective-to-physical address translation requested or effective-to-virtual-to-physical address translation requested, by that processor or other processors. Another example of TLB shootdown may also include an issuance of an inter-processor interrupt that causes the local invalidation of a TLB entry. If a processor issues a tlbie instruction, other processors receive a message that indicates the issuance of the tlbie instruction. That message also includes a page size and a page starting address, corresponding to the page to be invalidated.

A Bloom filter refers generally to a data structure that determines whether an element is a member of a set. In a bloom filter, a false positive, i.e., a result that indicates that a given condition is present when it is not, can occur. However, in the bloom filter, a false negative, i.e., a result that appears negative when it should not, cannot occur.

An example illustrating a conflict between a transaction and a TLB shootdown is the following: a first processor thread runs a transactional load instruction to a page pl. Subsequently, a second processor thread causes pl to be removed from a TLB or a page table (due to a page fault to a different page). A third processor thread then runs a transactional store instruction to pl, causing pl to be added in the TLB or its page table, this time at a different physical address. After the addition of pl to the TLB or the page table completes, the store instruction is run in the third thread, which should conflict with the load instruction of the first thread. However, because the physical address has changed, no conflict may be detected. Subsequently, the transaction of the first thread can be committed, despite that the commitment of the transaction by the first thread, after the change of the physical address of pl, may be erroneous since its load of pl may have returned a stale value.

SUMMARY

There is provided a method for detecting a conflict between a transaction and a TLB (Translation Lookaside Buffer) shootdown in a transactional memory in which a TLB shootdown operation message is received by a processor to invalidate at least one entry in a TLB of the processor corresponding to at least one page memory storage unit. The processor tracks pages touched by the transaction. The processor determines whether the received TLB shootdown operation message is associated with one of the touched pages. The processor aborts the transaction in response to determining that the received TLB shootdown operation message is associated with one of the touched pages.

The processor uses a data structure, e.g., a bloom filter, which has entries for the touched pages.

The processor initializes all entries in the data structure at the start of a transaction or at the end of that transaction.

In operation, the processor issues a load or store instruction. The processor determines a page size referenced by the load or store instruction. The processor checks whether a page size is tracked by using the data structure entries, and if so the processor determines an effective address referenced by the load or store instruction. The processor determines index bits of the load or store instruction based on the determined page size and the determined effective address. The processor runs at least one hash function with the determined index bits in order to find a first entry in the data structure corresponding to the load or store instruction. The processor sets a flag in the first entry of the data structure, for example setting a bit, if previously unset, from 0 to 1.

The processor checks whether a page size associated with the received TLB shootdown operation message is tracked by using the data structure entries. If so, the processor selects common bits from the page address (i.e., a virtual address of a particular page) associated with the received TLB shootdown command by choosing address bits that are common between the effective address and the virtual address for the associated page size. The processor runs the at least one hash function with the determined common bits in order to find a further entry in the data structure. The processor evaluates whether the further entry indicates that the corresponding flag is set. The processor aborts the transaction if the second entry indicates that the corresponding flag is set. On completion of the transaction, the processor allows the transaction to make changes made during the transaction permanent if the further entry does not indicate that the corresponding flag is set.

The processor aborts the transaction if the evaluated page size associated with the received TLB shootdown operation message is not tracked by using the data structure entries.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 2 illustrates exemplary bits used, as an input, in a hash function(s);

DETAILED DESCRIPTION

Figure 1:
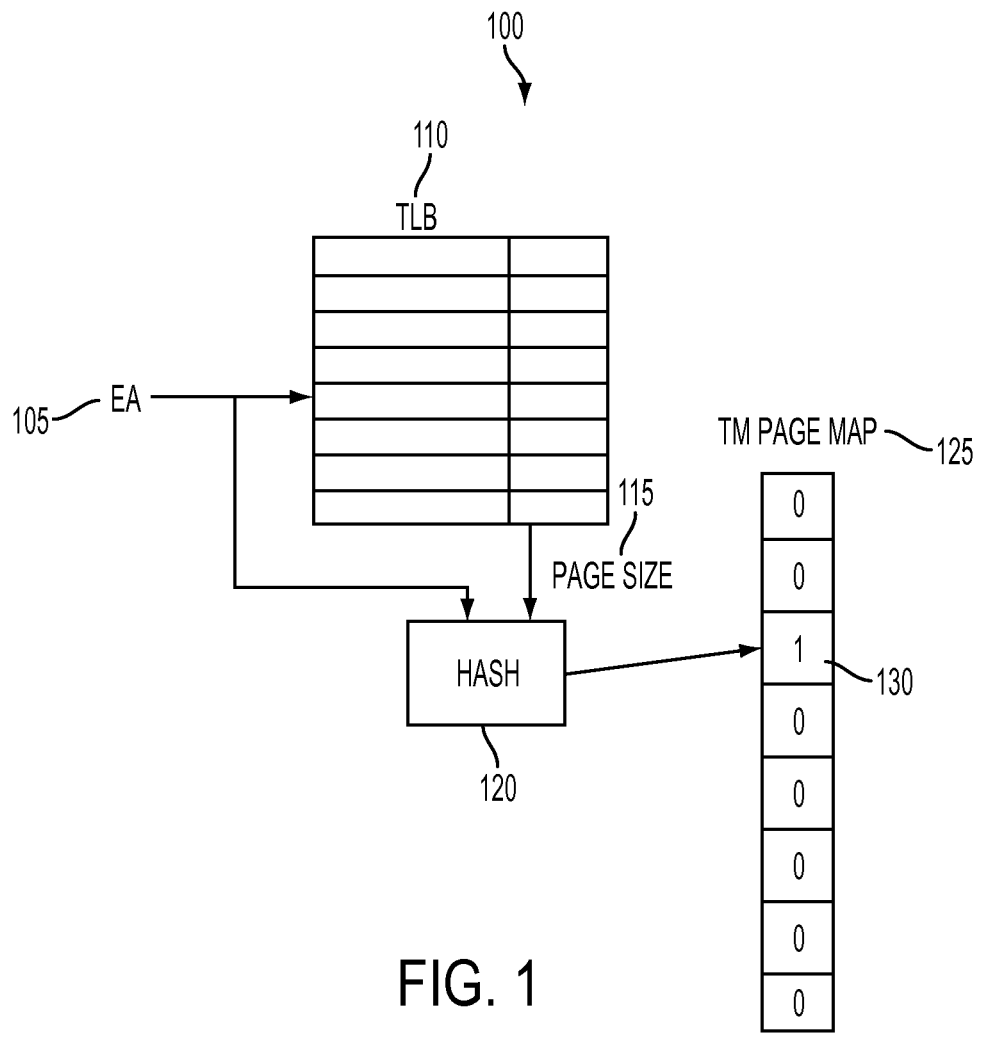
FIG. 1 illustrates a system by which a conflict between a transaction and a TLB shootdown is detected.

In one embodiment, in order to detect a conflict between a transaction and a TLB shootdown, a processor(s), e.g., IBM® PowerPC®, etc., tracks a set of pages touched by the transaction using a hash table called TM (Transactional Memory) page map. In one embodiment, the TM page map is a bloom filter that summarizes, e.g., by using at least one hash function, a set of addresses referenced during a transaction. The TM page map may be implemented, e.g., by using an n-bit register or SRAM (Static Random Access Memory). In one embodiment, the TM page map is indexed by bits common to both effective and virtual addresses, which are referenced by a transactional load or store instruction. In one embodiment, the location of the common bits in the effective address is determined based on the page size referenced by the transactional load or store instruction as shown in FIG. 2, which is described in detail below. A transactional load or store instruction refers to a load or store instruction involved in a transaction. There is one TM page map per a thread or per a processor. In one embodiment, when the number of bits common between effective and virtual address is large, a hash of those bits is taken to index the TM page map as shown in FIG. 1.

At each time a transaction begins, all bits of the TM page map are initialized, e.g., set to a value of zero. Upon issuing a load or store instruction during a transaction, a processor reads a page size referenced by that load or store instruction from a TLB or ERAT (Effective to Real Address translation Table) or other translation cache, and also determines an effective address referenced by that instruction. Then, the processor selects bits of the effective address that are shared between the effective address and the virtual address, and runs at least one hash function with the selected bits to create an index into the TM page map. Then, the processor indicates a flag in the TM page map entry at that index, e.g., to set that TM page map entry to a value of one. In an alternative embodiment, if the system's virtual memory architecture does not include a two-level virtual addressing layer, then the selected bits are a subset of the effective address, e.g., all bits above the address's lowermost page offset bits.

In one embodiment, in order to detect a TLB shootdown for a particular page, a processor may receive a TLB shootdown operation message broadcasted from another processor. The broadcasted TLB shootdown operation message specifies a virtual address to invalidate, which only shares some bits with the effective address as shown in FIG. 2. The set of bits that are shared is determined by the page size associated with the broadcasted TLB shootdown operation message. Then, the processor, which receives the TLB shootdown operation message, runs the hash function(s) with the determined shared bits in order to index into the TM page map. If the page map entry at that index indicates a flag, e.g., is set to a value of one, and if an active transaction exists, it is an indication that that transaction has touched that particular page. That transaction is aborted. In an alternative embodiment, if a system's virtual memory architecture does not include a virtual addressing layer, then the index to the TM page map is a subset of an effective address specified by the broadcasted TLB shootdown operation message, e.g., all bits above the effective address's lowermost page offset bits.

In one embodiment, in order to detect a conflict between a transaction and a TLB shootdown in a transactional memory, there is provided the TM page map data structure. TM page map may be implemented as a hash table and/or a bloom filter. A processor uses the data structure to track pages accessed or modified by processor transaction operations, e.g., transactional load or store instructions. In one embodiment, the processor includes and maintains the TM page map. While the processor runs an instruction(s) in a transaction, the processor may receive a message associated with a TLB shootdown operation. The TLB shootdown operation message includes a page size and a page address (i.e., virtual address) of a particular page that is to be invalidated. The TLB shootdown operation message includes information that another processor just issued an instruction associated with TLB shootdown. Alternatively, the TLB shootdown operation message is received during processing of an interrupt associated with the TLB shootdown.

Upon receiving the TLB shootdown operation message, the processor determines whether the TLB shootdown is associated with one of the accessed or modified pages during the transaction, e.g., by checking whether a corresponding TM page map entry indicates that a corresponding flag is set, e.g., is set to a logic value of one. An index of the corresponding TM page map entry is determined, e.g., by running at least one hash function on the address of an invalidated particular page, potentially determining which bits to use to index the TM page map based on the page size of the invalidated particular page. In response to determining that the TLB shootdown operation message is associated with one of the accessed or modified pages during the transaction, e.g., the corresponding TM page map entry indicates a flag, the processor will abort the transaction. However, if it is determined that the TLB shootdown operation message is not associated with one of the accessed or modified pages during the transaction, e.g., the corresponding TM page map entry does not indicate a flag, the processor may continue running the transaction and may commit all the changes made during the transaction upon completion of the transaction. Committing of changes includes making changes made during the transaction permanent. Therefore, according to one embodiment, the processor does not abort a transaction every time another processor invalidates a page whose page size is the same as the page size being accessed or modified during that transaction.

Figure 3:
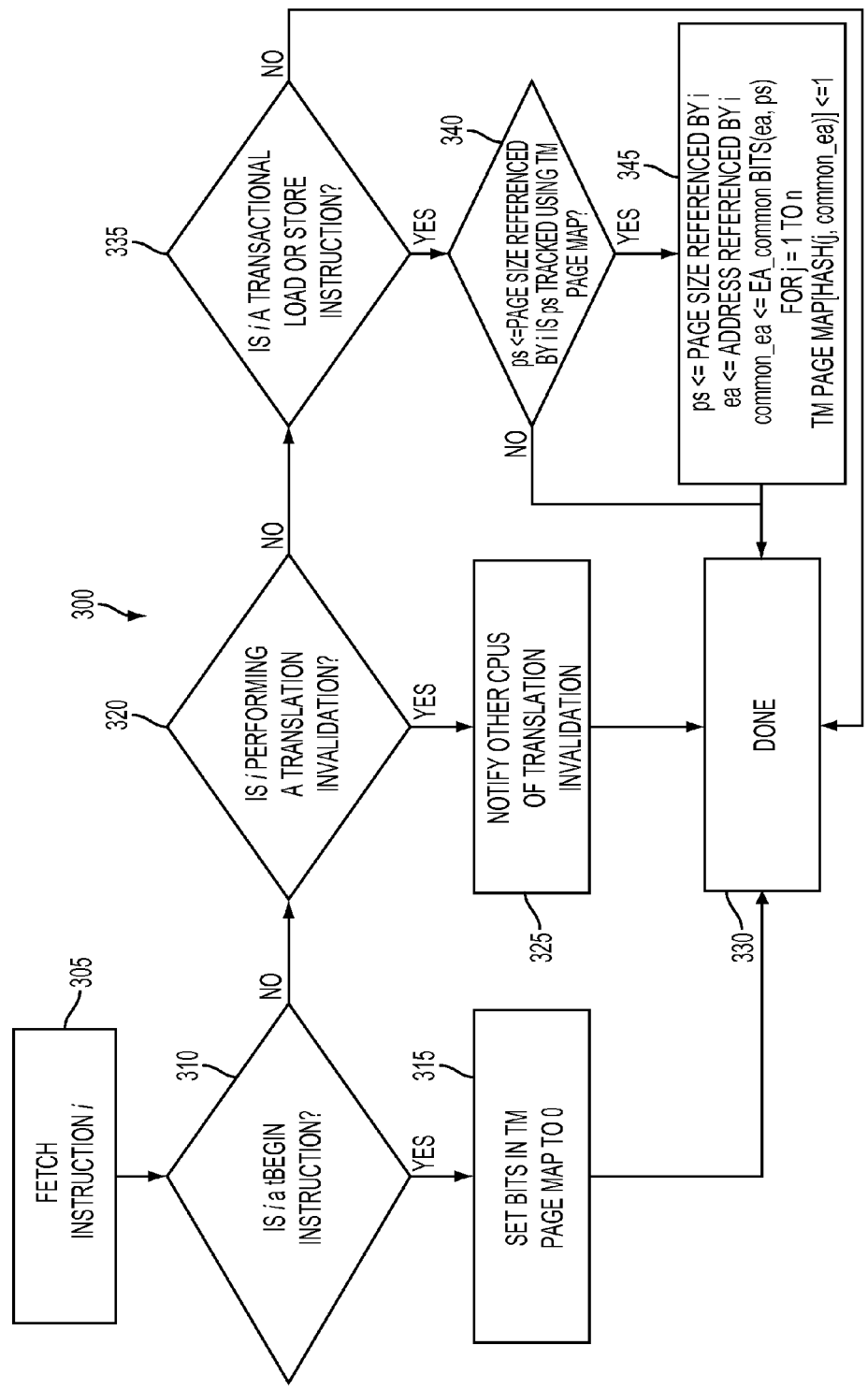
FIG. 3 illustrates a flow chart describing method steps for setting an entry of a bloom filter upon issuing a transactional load or store instruction.

FIG. 3 illustrates a flow chart describing method steps for setting an entry of a data structure upon a processor issuing a transactional load or store instruction. At step 305, the processor fetches an instruction i, e.g., from an instruction cache memory device (not shown) of a computer. At step 310, the processor evaluates whether the instruction i represents a start of a transaction, e.g., tbegin instruction, or an end of the transaction, e.g., tend instruction. At step 315, if the instruction i represents a start of a transaction or an end of the transaction, the processor initializes all entries in the data structure, e.g., all flags in all the entries are reset. At step 330, the control ends.

If the instruction i does not represent a start of a transaction or an end of the transaction, then at step 320, the processor evaluates whether the instruction i represents a TLB shootdown, e.g., tlbie instruction or translation invalidation instruction. If the instruction i represents the TLB shootdown, at step 325, the processor notifies other processors of the issuance of the TLB shootdown instruction, e.g., by sending messages that indicate an issuance of tlbie instruction. These messages also include a page number and a page size of a particular page being invalidated by the issuance of the TLB shootdown instruction. At step 330, the control ends.

If the instruction i does not represent the TLB shootdown, then at step 335, the processor evaluates whether the instruction i is a transactional load or store instruction. If the instruction i is not a transactional load or store instruction, then at step 330, the control ends. If the instruction i is a transactional load or store instruction, then at step 340, the processor determines a page size referenced by the load or store instruction. The determining of the page size referenced by the instruction corresponds to "ps<=page size referenced by i" at step 340. In one embodiment, the load or store instruction includes, but is not limited to: an effective address accessed by that instruction, one or more register numbers, data to be stored in the effective address, etc. By accessing a page table or TLB with the effective address in the instruction i, the processor obtains a page size referenced by the instruction i. The processor further determines whether the page size referenced by the instruction i is tracked by using the data structure. For example, the processor stores a table, e.g., table 200 shown in FIG. 2, in a cache memory device or a register. The table lists page sizes tracked by the data structure. So, by referencing the table, e.g., table 200, the processor determines whether a particular page size is tracked by using the data structure. For example, the table 200 lists the page sizes tracked by using the data structure.

Returning to FIG. 3, if the processor determines that the page size referenced by the instruction i is tracked by using the data structure, then at step 345, the processor further determines the effective address referenced by the instruction i. The determining of the effective address corresponds to "ea<=address referenced by i" at step 345. As described above, in one embodiment, the instruction itself includes an effective address accessed or modified by the instruction i. In one embodiment, in a two-level virtual memory translation system, e.g., IBM® PowerPC®, the processor further determines index bits, which are common bits between the effective address and the virtual address, referenced by the instruction i. The determining of the index bits corresponds to "common_ea<=EA_common bits (ea, ps)" at step 345. Table 200 shown in FIG. 2 further describes exemplary index bits. For example, regarding 4 KB page size, the index bits are 16 bits (e.g., from 36th bit to 51st bit) in the referenced effective address. Regarding 64 KB page size, the index bits are 12 bits (e.g., from 36th bit to 47th bit) in the referenced effective address. Regarding 16 MB page size, the index bits are 4 bits (e.g., from 36th bit to 39th bit) in the referenced effective address. Regarding 16 GB page size, the index bits are 6 bits (e.g., from 24th bit to 29th bit) in the referenced effective address. In another embodiment, in a single-level virtual memory translation system, e.g., Intel® processors, the processor determines the index bits as common bits between the effective address and a corresponding physical address. The number of index bits is relatively small, e.g., 4-6 bits, for 16 MB and 16 GB pages. The processor further runs at least one hash function with the determined index bits in order to find an entry in the data structure corresponding to a page referenced by the instruction i. (In step 345 in FIG. 3, n represents the number of hash functions used. j represents an index.) Then, the processor indicates a corresponding flag in the entry in the data structure, for example, the entry is set to a value of one. The indicating of the flag in the entry corresponds to "TM page map[hash(j, common_ea)]<=1" at step 345.

FIG. 1 illustrates a system in which an entry in a bloom filter called TM page table indicates a flag when a corresponding page is accessed or modified during a transaction. Upon fetching a transaction load or store instruction, a processor obtains an effective address "EA" 105 referenced by the instruction, e.g., from that instruction itself. By accessing a TLB or page table 110 with the effective address 105, the processor obtains a page size 115 of a page accessed by the effective address 105. The processor determines index bits based on the effective address 105 and the page size 115, e.g., as shown in the table 200 in FIG. 2. By applying at least one hash function 125 to the index bits, the processor finds an entry in the TM page table 125 which corresponds to the accessed page. The processor sets a corresponding flag 130 in the found entry in the TM page table 125. Setting a flag 130 in an entry in the TM page map 125 includes, but is not limited to: setting the entry to a value of one.

Figure 4:
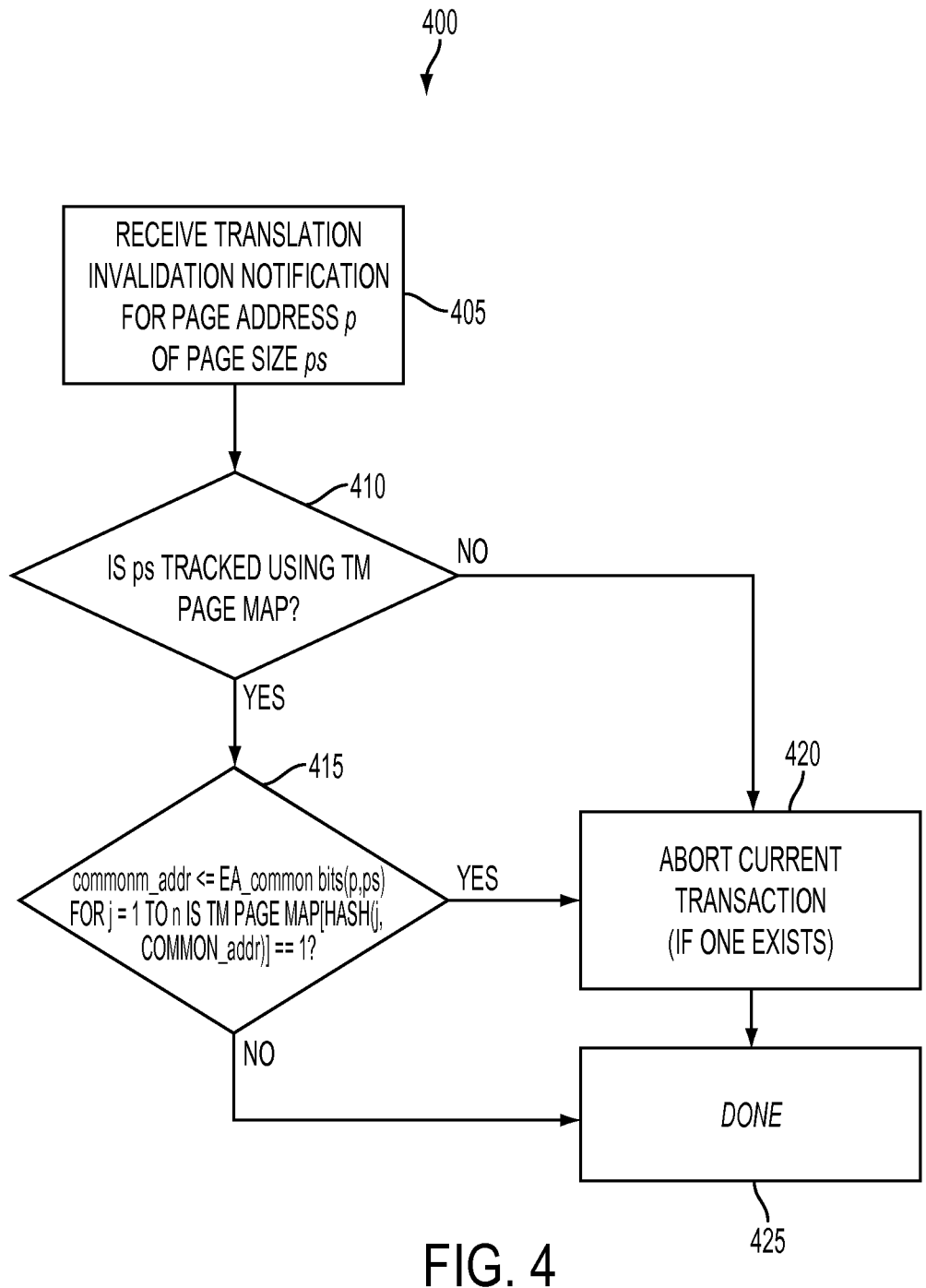
FIG. 4 illustrates a flow chart describing method steps for determining whether a transaction should be aborted or not.

FIG. 4 illustrates a flow chart describing method steps for determining whether a transaction should be aborted or not. At step 405, a processor receives a message associated with a TLB shootdown, e.g., tlbie instruction. The TLB shootdown (operation) message includes, but is not limited to: a page size ("ps") and a page address ("p") of a particular page being invalidated by the issuance of the TLB shootdown. In one embodiment, multiple TLB shootdown instructions or interrupts may be issued, if different page sizes are used in a memory region, in order to invalidate corresponding entries in TLBs of other processors. One TLB shootdown instruction or interrupt may invalidate a page that has a particular starting page address and has a particular page size.

At step 410, the processor evaluates whether the page size of the particular page is tracked by using the TM page map. In one embodiment, in order to perform this evaluation, the processor searches entries of the table 200 shown in FIG. 2. If there exists an entry in the table 200 corresponding to the page size, the processor determines that the page size of the particular page is tracked by using the TM page map. If the page size of the particular page is not tracked by using the TM page map, e.g., there is no corresponding entry in the table 200, at step 420, the processor aborts a current transaction(s) run by that processor if such transaction(s) exists.

If the page size of the particular page is tracked by using the TM page map, then at step 415, the processor determines common bits between the virtual address of the particular page (i.e., page address) and an effective address associated with the particular page. This determination of the common bits correspond to "common_addr<=EA_common bits (p, ps)" at step 415. For example, regarding a 4 KB page size, the common bits are the $36^{th}$ bit to $51^{st}$ bits of the page address. In other embodiments, the selection of bits to use as common bits may be differ, depending on a virtual memory page mapping architecture. The processor runs the same hash function(s), which is used at step 345 in FIG. 3, with the determined common bits in order to find a further entry in the TM page map. The processor evaluates whether the further entry indicates a flag. This evaluation corresponds to "Is TM page map[hash(j, common_addr)]==1 ?" at step 415. In one embodiment, each running of a hash function with the determined common bits finds an entry in the TM page map. Thus, by running multiple hash functions with the same determined common bits, the processor may be able to find multiple entries in its TM page map. The TM page map, implemented by a bloom filter, may allow a false positive but may not allow a false negative. In a further embodiment, the processor aborts the transaction corresponding to the determined common bits if all the found multiple entries indicate flags, e.g., are set to a value of one.

If the second entry indicates the flag, i.e., the particular page being invalidated by the TLB shootdown has been accessed or modified by a current transaction run by the processor, then at step 420, the processor aborts the current transaction. In one embodiment, upon receiving a TLB shootdown instruction or interrupt, a processor aborts its current transaction(s) if the page size described in the TLB shootdown instruction or interrupt is not tracked by the TM page map of that processor. Otherwise, if the further entry does not indicate a flag, i.e., pages touched by the current transaction are not invalidated by the TLB shootdown, then at step 425, the processor commits the current transaction. Committing a transaction includes, but is not limited to: making changes made during that transaction permanent. In one embodiment, the processor commits the transaction if any of the found multiple entries does not indicate a flag, e.g., if any of the found multiple entries is set to a value of zero. The TM page map prevents a transaction, which does not touch a page being invalidated from a TLB shootdown instruction, from being aborted.

In one embodiment, the TM page map of a processor is included in a memory storage device or a set of registers independent from a cache memory device of that processor and independent from a TLB of that processor. In another embodiment, the TM page map is embedded within the TLB of that processor. In one embodiment, the TM page map of a processor is embedded within a data cache memory device of that processor by marking cache lines that have been accessed during a current transaction of that processor. The processor searches marked cache lines in the data cache memory device in order to find cache lines that include some portions of pages touched during a current transaction and invalidated by a TLB shootdown.

As described above, a processor can utilize a bloom filter that filters page table shootdowns (e.g. from tlbie instruction) that cause a transaction to be aborted. This utilization of the bloom filter involves an amount of additional hardware, e.g., adding a hash table. The benefits of the utilization of the bloom filter include, but are not limited to: (1) there is no need for new software in order to support the utilization of the bloom filter; (2) changes to a processor design are restricted to a single unit, e.g., a load and store unit; and (3) the changes to the processor design is minor, e.g., requiring only a m-bit register per a thread, where m may be, for example, 64 bits. The size of the bloom filter and choices of hash functions are diverse. An example of a hash function may use an exclusive-or logic of a subset of effective address bits to form an index into the bloom filter. A variety of other hashing strategies are also available.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for detecting a conflict between a transaction and a TLB (Translation Lookaside Buffer) shootdown in a transactional memory in which a TLB shootdown operation message is received by a processor to invalidate at least one entry in a TLB of said processor corresponding to at least one page, the method comprising:
   providing a data structure having entries for pages touched by said transaction and having further entries for page sizes of said touched pages;
   providing a table having entries for page sizes of said touched pages, each page size entry of said table indicating an associated set of index bit positions corresponding to each page size;
   tracking, by said processor, using said data structure, said pages touched by said transaction;
   determining, by said processor, whether said received TLB shootdown operation message is associated with one of said touched pages, said determining comprising:
   checking said table for an entry indicating whether a page size associated with said received TLB shootdown operation message is tracked by using said data structure;
   aborting, by said processor, said transaction in response to determining that there exists no entry in said table which corresponds to said page size associated with said received TLB shootdown operation message, and responsive to determining an entry corresponding to said associated page size exists in said table, checking said data structure, using said associated page size and said set of index bit positions, for an entry indicating said TLB shootdown operation message conflicts with one of said pages touched by said transaction; and
   aborting said transaction in response to determining that said received TLB shootdown operation message conflicts with said one of said touched pages.

2. The method according to claim 1, further comprising:
   initializing all said entries in said data structure at a start of said transaction or at an end of said transaction.

3. The method according to claim 1, further comprising:
   issuing a load or store instruction associated with said transaction;
   determining a page size referenced by said load or store instruction;
   determining whether the determined page size is tracked by said data structure;
   determining an effective address referenced by said load or store instruction in response to determining that said determined page size is tracked by the data structure;
   determining index bits of said load or store instruction based on said determined page size and said determined effective address;
   running at least one hash function with said determined index bits in order to locate an entry in said data structure corresponding to a page touched by said load or store instruction of said transaction; and
   setting a flag in said entry corresponding to said page touched by said transaction.

4. The method according to claim 3, further comprising:
   determining a page address associated with said received TLB shootdown operation message if said associated page size is tracked by using said data structure;
   selecting a subset of common bits between an effective address and the page address, referenced by said load or store instruction, in order to use the selected subset as said determined index bits, wherein the selected subset is determined by said page size;
   running said at least one hash function with said determined index bits in order to locate a further entry in said data structure;
   evaluating whether said further entry indicates said set flag; and
   aborting said transaction if said further entry indicates said set flag.

5. The method according to claim 1, wherein said data structure is a bloom filter.

6. The method according to claim 1, wherein said data structure is included in a memory storage device or a set of registers independent from a cache memory device and independent from said TLB.

7. The method according to claim 1, wherein said data structure is embedded within said TLB.

8. The method according to claim 1, wherein said data structure is embedded within a data cache memory device by marking cache lines that have been accessed during said transaction.

9. The method according to claim 8, further comprising:
   searching said marked cache lines in said data cache memory device in order to find cache lines that include portions of said touched pages.

10. The method according to claim 4, further comprising:
    making changes made during said transaction permanent if said further entry does not indicate said flag.

11. The method according to claim 4, wherein the page address is a corresponding virtual address in a two-level virtual memory system, or a corresponding physical address in a single-level virtual memory system.

12. The method according to claim 3, further comprising:
running multiple hash functions with said selected subset of common bits;
locating multiple entries, in said data structure, which correspond to results of the running the multiple hash functions;
aborting said transaction if all of said located entries, in said data structure, indicate flags that represent that one or more pages, corresponding to said all located entries, are invalidated by said TLB shootdown operation message and said one or more pages are accessed or modified by said transaction; and
making changes made during said transaction permanent if any of the said located entries does not indicate said flag.

* * * * *